(12) United States Patent
Zhou et al.

(10) Patent No.: US 10,739,081 B2
(45) Date of Patent: Aug. 11, 2020

(54) MANUFACTURING METHOD OF VAPOR CHAMBER WATER-FILLING SECTION SEALING STRUCTURE

(71) Applicant: ASIA VITAL COMPONENTS CO., LTD., New Taipei (TW)

(72) Inventors: Xiao-Xiang Zhou, New Taipei (TW); Jian Zhang, New Taipei (TW); Han-Min Liu, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 129 days.

(21) Appl. No.: 15/921,666

(22) Filed: Mar. 15, 2018

(65) Prior Publication Data

US 2019/0247964 A1 Aug. 15, 2019

(30) Foreign Application Priority Data

Feb. 13, 2018 (TW) .............................. 107105374 A

(51) Int. Cl.
| | | |
|---|---|---|
| *F28D 15/02* | (2006.01) | |
| *F28D 15/04* | (2006.01) | |
| *B23P 15/26* | (2006.01) | |

(52) U.S. Cl.
CPC .......... *F28D 15/0283* (2013.01); *B23P 15/26* (2013.01); *F28D 15/0233* (2013.01); *F28D 15/04* (2013.01); *B23P 2700/09* (2013.01)

(58) Field of Classification Search
CPC .. F28D 15/0283; F28D 15/0233; F28D 15/04; B23P 15/26; B23P 2700/09; Y10T 29/5116; Y10T 29/4935; Y10T 29/49353; Y10T 29/49366; Y10T 29/49387
USPC ........ 29/890.03, 890.032, 890.039, 890.051, 29/34 R
See application file for complete search history.

(56) References Cited

U.S. PATENT DOCUMENTS

| | | | | |
|---|---|---|---|---|
| 7,273,006 | B2* | 9/2007 | Rasmussen | B21D 17/02 101/28 |
| 7,770,633 | B2* | 8/2010 | Miyahara | F28D 15/046 165/128 |
| 2007/0012431 | A1* | 1/2007 | Miyahara | F28D 15/0233 165/170 |

(Continued)

*Primary Examiner* — Sarang Afzali
*Assistant Examiner* — Darrell C Ford
(74) *Attorney, Agent, or Firm* — Jackson IPG PLLC; Demian K. Jackson

(57) ABSTRACT

A manufacturing method of a vapor chamber water-filling section sealing structure. The vapor chamber water-filling section sealing structure includes a main body and a capillary structure. The main body has a first plate body and a second plate body, which are correspondingly mated with each other to together define an airtight chamber and a water-filling section. A flange is disposed along an outer periphery of the main body. The water-filling section has a water-filling notch and a water-filling passage. Two ends of the water-filling passage are respectively connected with the flange and the water-filling notch to communicate with the airtight chamber. A portion of the water-filling passage that is connected with the flange is pressed to have a height equal to the height of the flange or lower than the height of the flange. The capillary structure is disposed in the airtight chamber of the main body.

6 Claims, 15 Drawing Sheets

(56) References Cited

U.S. PATENT DOCUMENTS

| | | | | |
|---|---|---|---|---|
| 2009/0025910 | A1* | 1/2009 | Hoffman | F28D 15/046 165/104.26 |
| 2009/0178784 | A1* | 7/2009 | Wang | B23P 15/26 165/104.26 |
| 2012/0285662 | A1* | 11/2012 | Meyer, IV | F28D 15/04 165/104.26 |
| 2013/0092353 | A1* | 4/2013 | Yang | F28D 15/04 165/104.26 |
| 2014/0166243 | A1* | 6/2014 | Lin | F28D 15/046 165/104.26 |
| 2016/0221131 | A1* | 8/2016 | Shen | B23P 15/26 |
| 2016/0290739 | A1* | 10/2016 | Mochizuki | F28F 21/083 |
| 2019/0160600 | A1† | 5/2019 | Tseng | |
| 2020/0025461 | A1* | 1/2020 | Lin | F28D 15/0283 |

\* cited by examiner
† cited by third party

```
┌─────────────────────────────────────┐
│ providing a first plate body and a  │─── S1
│  second plate body ;                │
└─────────────────────────────────────┘
                 │
                 ▼
┌─────────────────────────────────────┐
│ mechanically processing any of the  │─── S2
│  first and second plate bodies to   │
│  plastically deform the first and   │
│  second plate bodies so as to form  │
│  a depression and a water-filling   │
│  notch and a water-filling passage  │
│  thereon with the water-filling     │
│  passage connected with a tubular   │
│  body ;                             │
└─────────────────────────────────────┘
                 │
                 ▼
┌─────────────────────────────────────┐
│ mating the first and second plate   │─── S3
│  bodies with each other and sealing │
│  the edges of the first and second  │
│  plate bodies to together define an │
│  airtight chamber and sucking air   │
│  out of the airtight chamber and    │
│  filling water into the airtight    │
│  chamber through the tubular body ; │
└─────────────────────────────────────┘
                 │
                 ▼
┌─────────────────────────────────────┐
│ pressing a portion of the           │─── S4
│  water-filling passage that is not  │
│  overlapped with the tubular body   │
│  to seal the water-filling passage  │
│  and extracting the tubular body    │
│  out of the water-filling passage   │
│  to fully seal the edges            │
└─────────────────────────────────────┘
                 │
                 ▼
┌─────────────────────────────────────┐
│ cutting off the part of the         │─── S6
│  water-filling section that         │
│  protrudes from the edges of the    │
│  first and second plate bodies      │
└─────────────────────────────────────┘
```

Fig. 14

MANUFACTURING METHOD OF VAPOR CHAMBER WATER-FILLING SECTION SEALING STRUCTURE

This application claims the priority benefit of Taiwan patent application number 107105374 filed on Feb. 13, 2018.

BACKGROUND OF THE INVENTION

1. Field of the Invention

The present invention relates generally to a manufacturing method of a vapor chamber water-filling section sealing structure, and more particularly to a manufacturing method of a vapor chamber water-filling section sealing structure, which can increase the vapor-liquid circulation space of the internal chamber and prevent the water-filling section protruding from the edge of the main body from being collided and damaged to fail.

2. Description of the Related Art

Currently, the vapor chamber is the most often seen heat dissipation structure body. The vapor chamber mainly provides large area face-to-face direct heat conduction, whereby the heat of one single heat source or multiple heat sources can be quickly conducted and dissipated. The heat conduction principle of the vapor chamber is substantially identical to that of the heat pipe. However, the vapor chamber is composed of two plate bodies, which are overlapped and mated with each other. The edges of the two plate bodies are then sealed to form a closed space. In addition, a water-filling tube is sandwiched and connected between the two plate bodies. The water-filling tube protrudes from the edges of the two plate bodies. Via the water-filling tube, the closed space is vacuumed and filled with water. Finally, the water-filling tube is sealed to achieve the vapor chamber.

Please refer to FIG. 1, which is a perspective view of a conventional vapor chamber. As shown in FIG. 1, in the manufacturing process of the vapor chamber 3, the closed space is vacuumed and filled with water via the water-filling tube 31. Finally, the tail end of the water-filling tube 31 is narrowed and sealed to avoid leakage of vacuum and the working fluid. The water-filling tube 31 of the conventional vapor chamber 3 protrudes from the edge of the vapor chamber 3. Therefore, during transfer, the water-filling tube 31 is apt to be collided and broken to cause leakage of the working fluid and the vacuum.

Please now refer to FIG. 2, which is a perspective view of another conventional vapor chamber. As shown in FIG. 2, the vapor chamber 3 is mainly composed of a first plate body 3a and a second plate body 3b, which are mated with each other by means of diffusion bonding to together define a closed chamber (not shown). A water-filling tube 31 is held between the first and second plate bodies 3a, 3b. In order to solve the above problem that the water-filling tube 31 protrudes from the edge of the vapor chamber 3, the vapor chamber 3 is further formed with an inward recessed notch 32 in which the water-filling tube 31 is disposed.

Some manufacturers further dispose a protection structure 32 to up and down hold and protect the water-filling tube 31 from collision and damage.

However, the protection structure 32 will hinder the sealing operation of the water-filling tube 31 to lead to inconvenience. In addition, the notch and the protection structure 32 will greatly reduce the range or capacity of the closed chamber of the vapor chamber 3. As a result, the heat conduction efficiency of the vapor chamber 3 is greatly lowered.

In addition to the above shortcomings, in the conventional vapor chamber structure as shown in FIGS. 1 and 2, a section is reversed for disposing the water-filling tube 31. Therefore, it is necessary to sacrifice some portions of the vapor chamber 3. This will reduce the area of the working portion of the vapor chamber 3. Therefore, it has become a critical topic how to eliminate the shortcomings of the conventional vapor chamber or even omit the water-filling tube 31.

SUMMARY OF THE INVENTION

It is therefore a primary object of the present invention to provide a manufacturing method of a vapor chamber water-filling section sealing structure, which can prevent the water-filling section protruding from the edge of the vapor chamber from being collided and damaged to fail.

To achieve the above and other objects, the vapor chamber water-filling section sealing structure of the present invention includes a main body and a capillary structure.

The main body has a first plate body and a second plate body. The first and second plate bodies are correspondingly mated with each other to together define an airtight chamber and a water-filling section. A flange is disposed along an outer periphery of the main body. The water-filling section has a water-filling notch and a water-filling passage. Two ends of the water-filling passage are respectively connected with the flange and the water-filling notch to communicate with the airtight chamber. A portion of the water-filling passage that is connected with the flange is pressed and sealed to have a height equal to the height of the flange or lower than the height of the flange. The capillary structure is disposed in the space of the airtight chamber of the main body.

To achieve the above and other objects, the manufacturing method of the vapor chamber water-filling section sealing structure of the present invention includes steps of:

S1. providing a first plate body and a second plate body;

S2. mechanically processing any of the first and second plate bodies to plastically deform the first and second plate bodies so as to form a depression and a water-filling notch and a water-filling passage thereon with the water-filling passage connected with a tubular body;

S3. mating the first and second plate bodies with each other and sealing the edges of the first and second plate bodies to together define an airtight chamber and sucking air out of the airtight chamber and filling water into the airtight chamber through the tubular body; and S4. pressing a portion of the water-filling passage that is not overlapped with the tubular body to seal the water-filling passage and extracting the tubular body out of the water-filling passage to fully seal the edges.

To achieve the above and other objects, the manufacturing method of the vapor chamber water-filling section sealing structure of the present invention includes steps of:

S1. providing a first plate body and a second plate body;

S2. mechanically processing any of the first and second plate bodies to plastically deform the first and second plate bodies so as to form a depression and a water-filling notch and a water-filling passage thereon with the water-filling passage connected with a tubular body;

S3. mating the first and second plate bodies with each other and sealing the edges of the first and second plate bodies to together define an airtight chamber and sucking air out of the airtight chamber and filling water into the airtight chamber through the tubular body; and S4. pressing the water-filling passage and the portion of the tubular body that is inserted in the water-filling passage and overlapped with the water-filling passage to seal the edges and cutting off the part protruding from the edges of the first and second plate bodies.

The manufacturing method of the vapor chamber water-filling section sealing structure of the present invention can eliminate the shortcoming of the conventional vapor chamber that the water-filling section protrudes from the edge of the main body and is apt to be collided and damaged to fail. In addition, by means of the design of the water-filling section of the present invention, the area for sealing the edges is greatly increased to enhance the tightness of the sealed edge. Also, vapor-liquid circulation space and capacity of the internal chamber is increased to enhance the heat dissipation efficiency.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 14 is a flow chart of a third embodiment of the manufacturing method of the vapor chamber water-filling section sealing structure of the present invention.

DETAILED DESCRIPTION OF THE PREFERRED EMBODIMENTS

Figure 1:
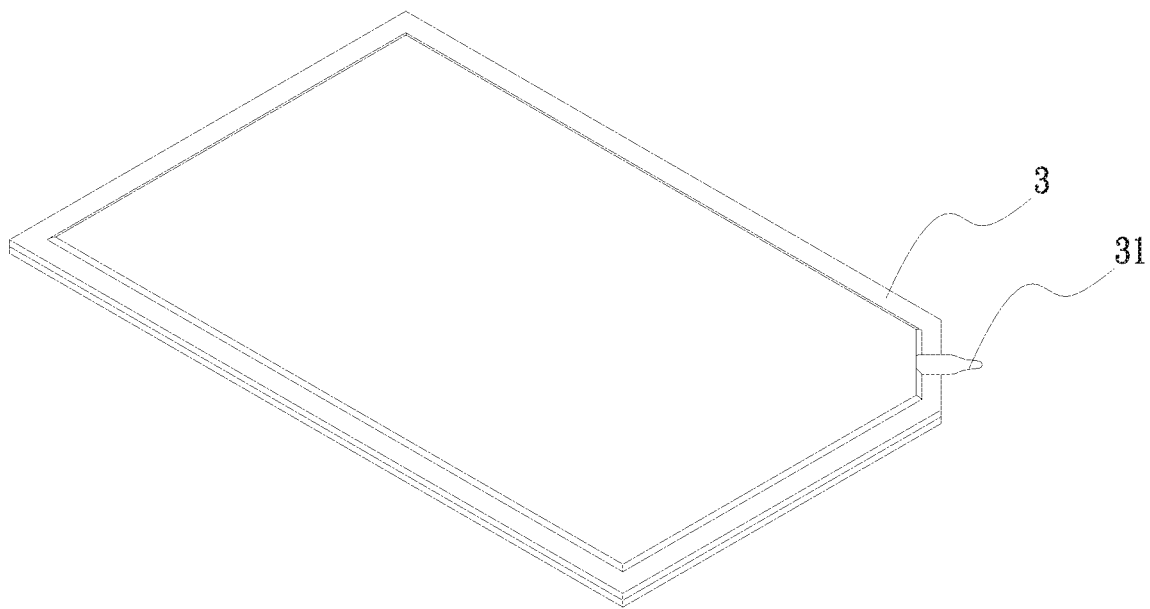
FIG. 1 is a perspective view of a conventional vapor chamber.
Figure 2:
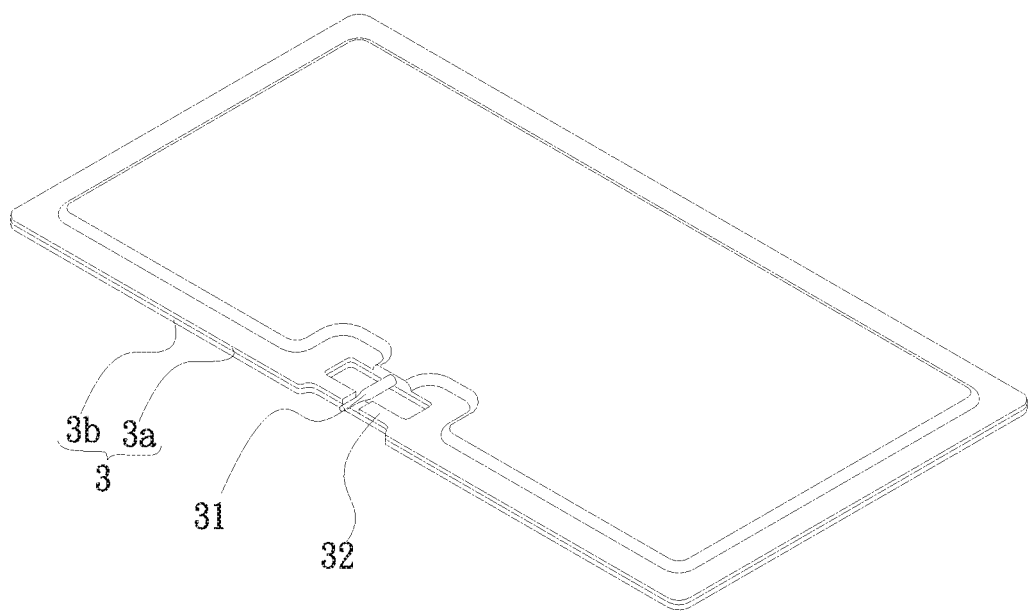
FIG. 2 is a perspective view of another conventional vapor chamber.
Figure 3:
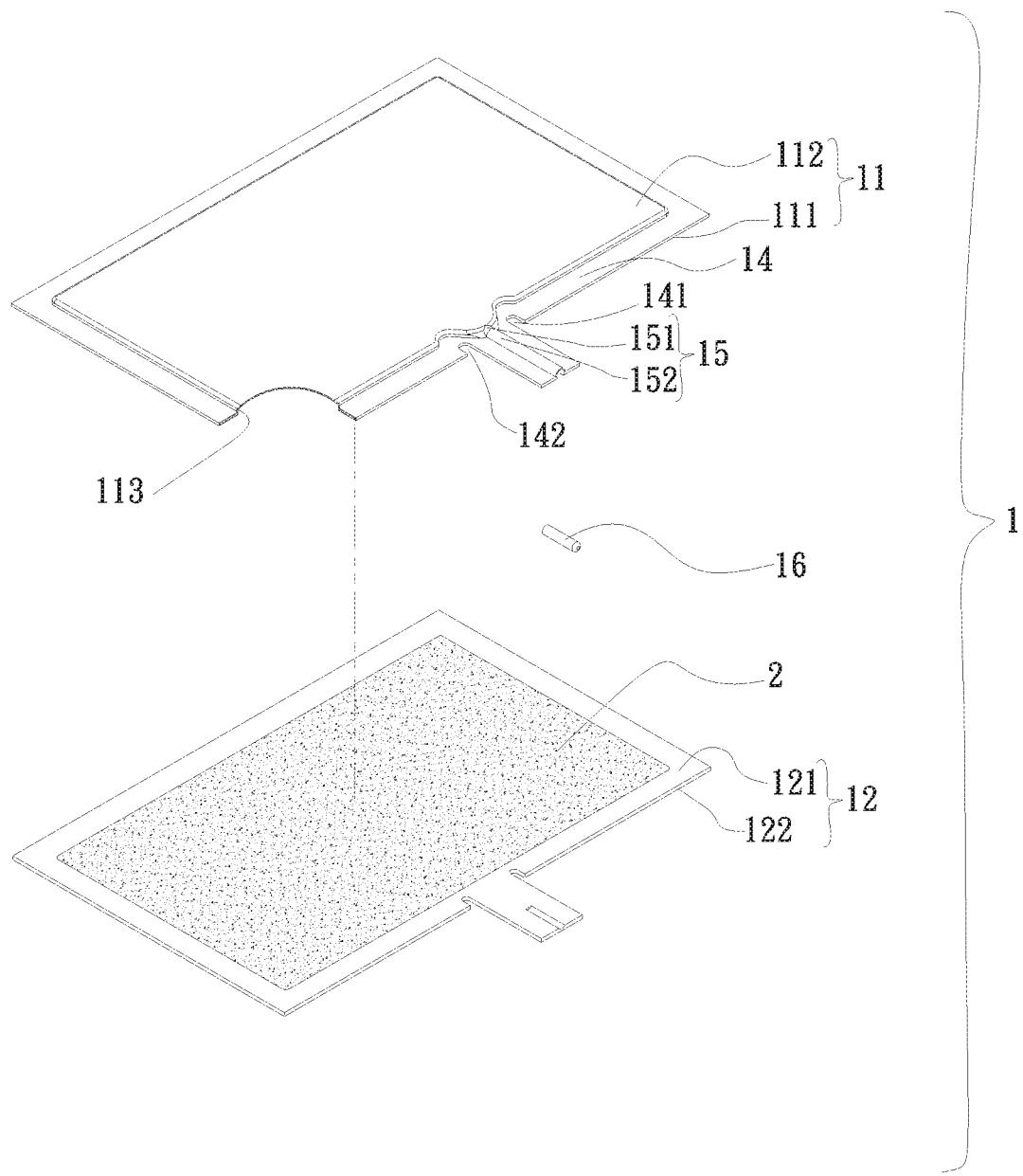
FIG. 3 is a perspective exploded view of a first embodiment of the vapor chamber water-filling section sealing structure of the present invention.
Figure 4:
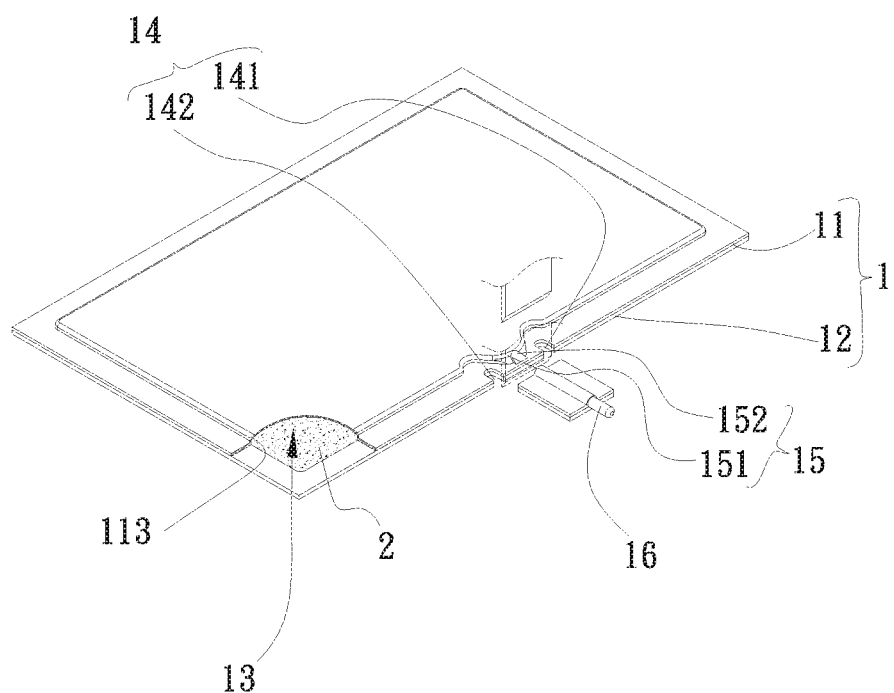
FIG. 4 is a perspective assembled view of the first embodiment of the vapor chamber water-filling section sealing structure of the present invention.

Please refer to FIGS. 3 and 4. FIG. 3 is a perspective exploded view of a first embodiment of the vapor chamber water-filling section sealing structure of the present invention. FIG. 4 is a perspective assembled view of the first embodiment of the vapor chamber water-filling section sealing structure of the present invention. According to the first embodiment, the vapor chamber water-filling section sealing structure of the present invention includes a main body 1 and a capillary structure 2.

The main body 1 has a first plate body 11 and a second plate body 12. The first and second plate bodies 11, 12 are correspondingly mated with each other to together define an airtight chamber 13 and a water-filling section 15. A flange 14 is disposed along an outer periphery of the main body 1, (that is, the flange 14 is disposed along the outer periphery of the first and second plate bodies 11, 12). The water-filling section 15 has a water-filling notch 151 and a water-filling passage 152. One end of the water-filling passage 152 extends to connect with the flange 14. The other end of the water-filling passage 152 connects with the airtight chamber 13 via the water-filling notch 151. A portion of the water-filling passage 152 that extends to connect with the flange 14 is pressed to have a height equal to the height of the flange 14 or lower than the height of the flange 14.

The first plate body 11 has a first face 111 and a second face 112. The second plate body 12 has a third face 121 and a fourth face 122. A depression 113 and the water-filling section 15 are raised from the first face 111 to the second face 112 of the first plate body 11. The third face 121 of the second plate body 12 is correspondingly mated with the depression 113 to form the airtight chamber 13. That is, the depression 113 and the water-filling section 15 (the water-filling notch 151 and the water-filling passage 152) are selectively raised from the second face 112 of the first plate body 11 or the fourth face 122 of the second plate body 12. In this embodiment, the depression 113 and the water-filling section 15 are, but not limited to, raised from the second face 112 of the first plate body 11 for illustration purposes. As aforesaid, the third face 121 of the second plate body 12 is correspondingly mated with the depression 113 to seal the open side of the depression 113 and the open side of the water-filling section 15. In addition, the flange 14 of the first and second plate bodies 11, 12 is sealed and connected by means of diffusion bonding.

The second face 112 and the fourth face 122 are respectively disposed on the upper and lower faces of the main body 1. The second face 112 is defined as a condensation face, while the fourth face 122 is defined as a heat absorption face.

When sealing the water-filling passage 152, any part of the water-filling passage 152 is selectively pressed and flattened to have a height equal to the height of the flange 14 or lower than the height of the flange 14. In addition, the water-filling passage 152 can be cut to be flush with the flange 14 or slightly retracted into the flange 14. The flange 14 of the first and second plate bodies 11, 12 has a first notch 141 and a second notch 142 in a position where the water-filling notch 151 is positioned. In the case it is necessary to cut off the part of the water-filling section 15 that protrudes from the flange 14, the first and second notches 141, 142 serve to reduce the possibility of stress concentration.

The capillary structure 2 is selectively disposed on the first face 111 of the first plate body 11 or the third face 121 of the second plate body 12 or both the first face 111 of the first plate body 11 and the third face 121 of the second plate body 12. In this embodiment, the capillary structure 2 is, but not limited to, disposed on the third face 121 of the second plate body 12. The first and second plate bodies 11, 12 are made of a material selected from a group consisting of aluminum, copper, commercial pure titanium, aluminum alloy, copper alloy, ceramic, stainless steel and a combination thereof. The capillary structure 2 is selected from a group consisting of sintered powder, channeled body, mesh body, fiber body and whiskers.

Figure 5:
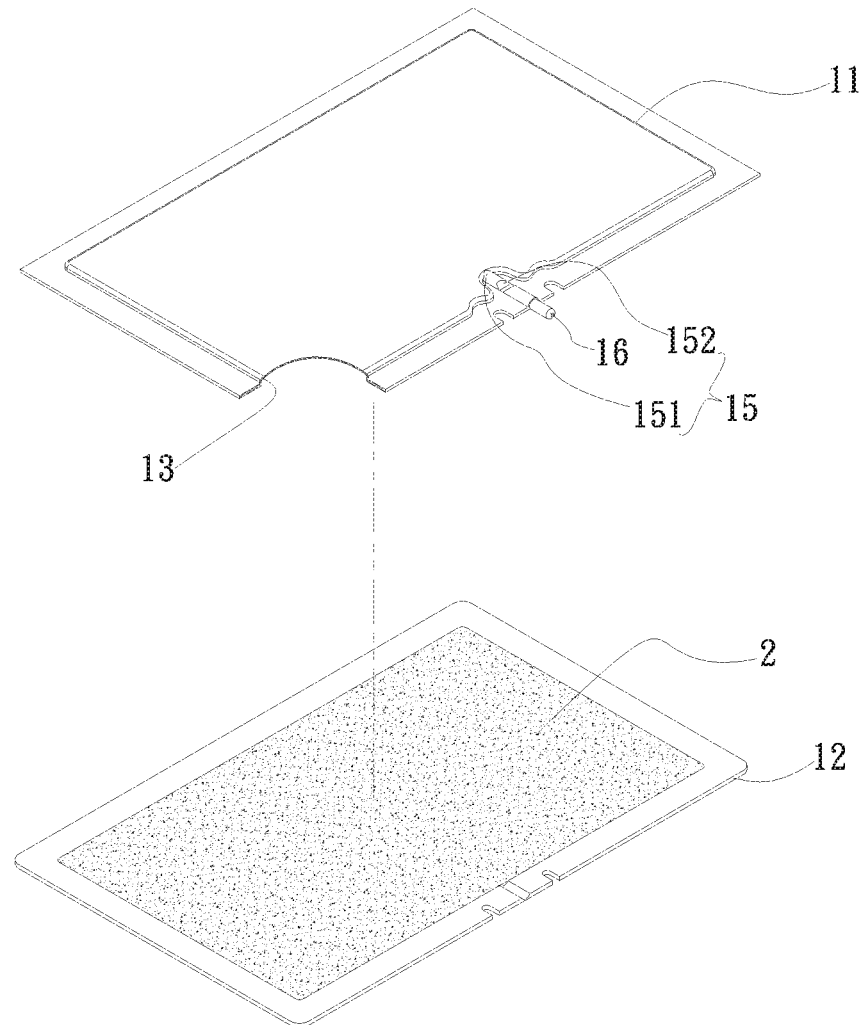
FIG. 5 is a perspective exploded view of a second embodiment of the vapor chamber water-filling section sealing structure of the present invention.
Figure 6:
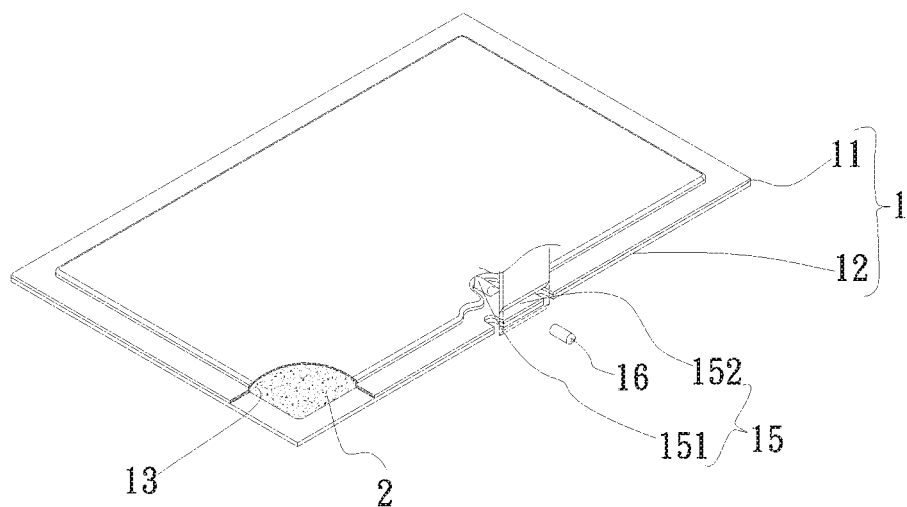
FIG. 6 is a perspective assembled view of the second embodiment of the vapor chamber water-filling section sealing structure of the present invention.

Please now refer to FIGS. 5 and 6. FIG. 5 is a perspective exploded view of a second embodiment of the vapor chamber water-filling section sealing structure of the present invention. FIG. 6 is a perspective assembled view of the second embodiment of the vapor chamber water-filling section sealing structure of the present invention. The second embodiment is partially identical to the first embodiment in structure and thus will not be repeatedly described hereinafter. The second embodiment is different from the first embodiment in that the water-filling notch 151 extends to the airtight chamber 13. One end of the water-filling notch 151 distal from the airtight chamber 13 extends to the water-filling passage 152. The water-filling passage 152 extends to the flange 14. When sealing the water-filling passage 152, any part of the water-filling passage 152 is selectively pressed and flattened to have a height equal to the height of the flange 14 or lower than the height of the flange 14.

Figure 7:
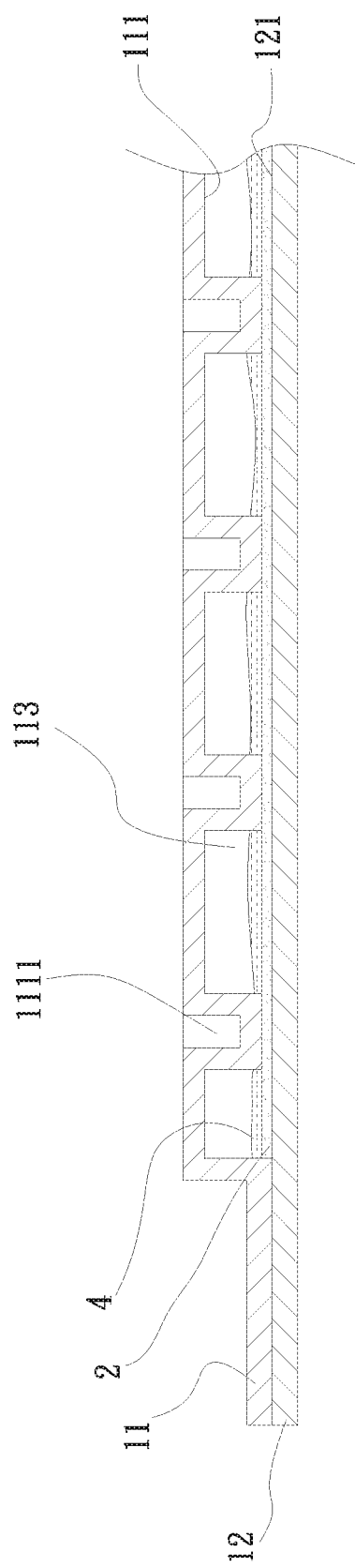
FIG. 7 is a sectional assembled view of a third embodiment of the vapor chamber water-filling section sealing structure of the present invention.

Please now refer to FIG. 7, which is a sectional assembled view of a third embodiment of the vapor chamber water-filling section sealing structure of the present invention. The third embodiment is partially identical to the first embodiment in structure and thus will not be repeatedly described hereinafter. The third embodiment is different from the first embodiment in that multiple pits 1111 are disposed on the first face 111 of the first plate body 11. The pits 1111 protrude and extend from the first face 111 to the depression 113 to abut against one face of the capillary structure 2. When the vapor-liquid circulation of the working fluid 4 in the main body 1 takes place, the pits 1111 serve to enhance the backflow of the condensed working fluid 4 and increase the supporting strength between the first and second plate bodies 11, 12. Alternatively, support columns (not shown) can be disposed between the first and second plate bodies 11, 12. Two ends of the support columns respectively abut against the first and third faces 111, 121. This structure also can increase the supporting strength between the first and second plate bodies 11, 12.

In addition, a coating can be disposed on the surfaces of the first and third faces 111, 121 and the capillary structure as a structure for enhancing the efficiency of the vapor-liquid circulation of the working fluid 4 in the main body 1. The coating can be a hydrophilic coating or a hydrophobic coating.

Figure 8:
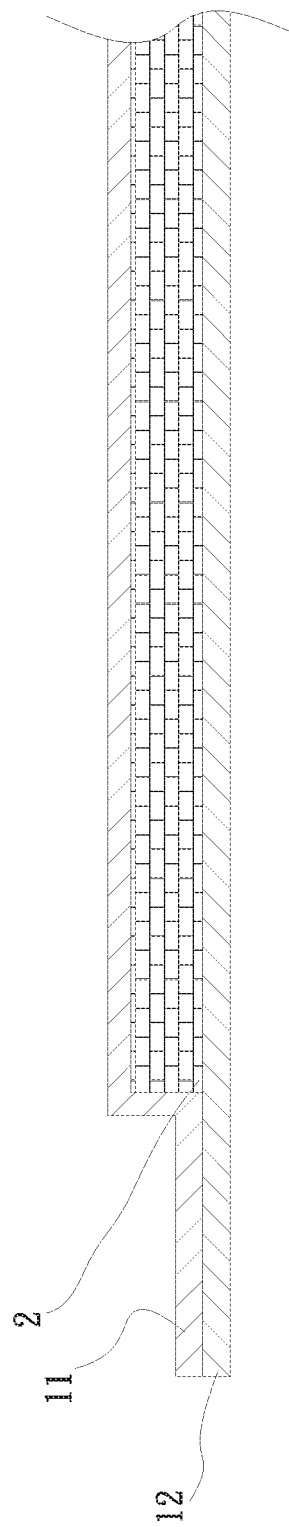
FIG. 8 is a sectional assembled view of a fourth embodiment of the vapor chamber water-filling section sealing structure of the present invention.

Please now refer to FIG. 8, which is a sectional assembled view of a fourth embodiment of the vapor chamber water-filling section sealing structure of the present invention. The fourth embodiment is partially identical to the first embodiment in structure and thus will not be repeatedly described hereinafter. The fourth embodiment is different from the first embodiment in that the capillary structure 2 is an independent component without being previously formed on the first and second plate bodies 11, 12. The capillary structure 2 is directly sandwiched between the first and second plate bodies 11, 12.

Figure 9:
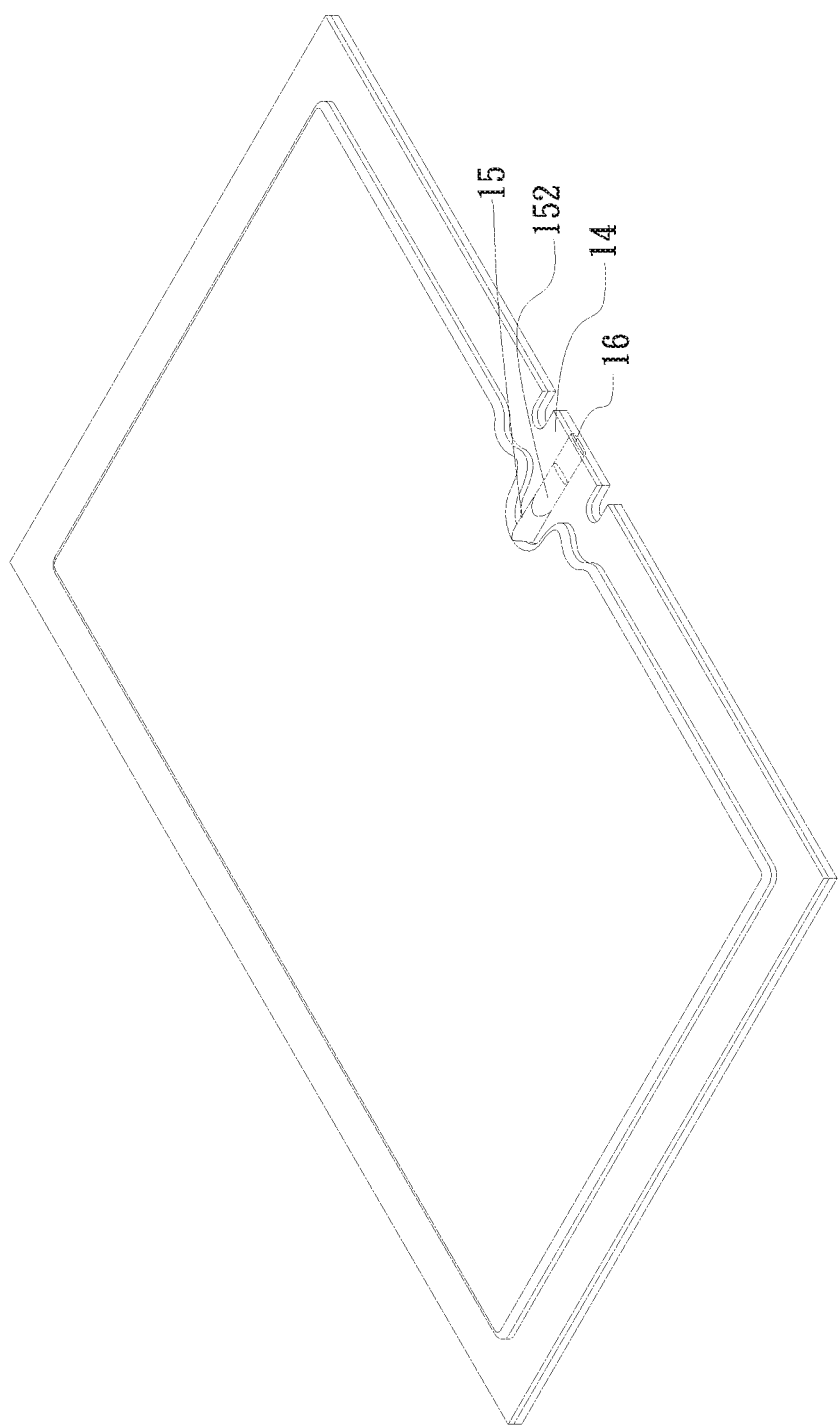
FIG. 9 is a perspective assembled view of a fifth embodiment of the vapor chamber water-filling section sealing structure of the present invention.

Please now refer to FIG. 9, which is a perspective assembled view of a fifth embodiment of the vapor chamber water-filling section sealing structure of the present invention. The fifth embodiment is partially identical to the first embodiment in structure and thus will not be repeatedly described hereinafter. The fifth embodiment is different from the first embodiment in that the main body 1 has a tubular body 16. The tubular body 16 is connected with the water-filling passage 152 of the water-filling section 15 of the main body 1. The tubular body 16 and the portion of the water-filling passage 152 that extends to the flange 14 are together pressed and connected with each other to have a height equal to the height of the flange 14 or lower than the height of the flange 14.

Figure 10:
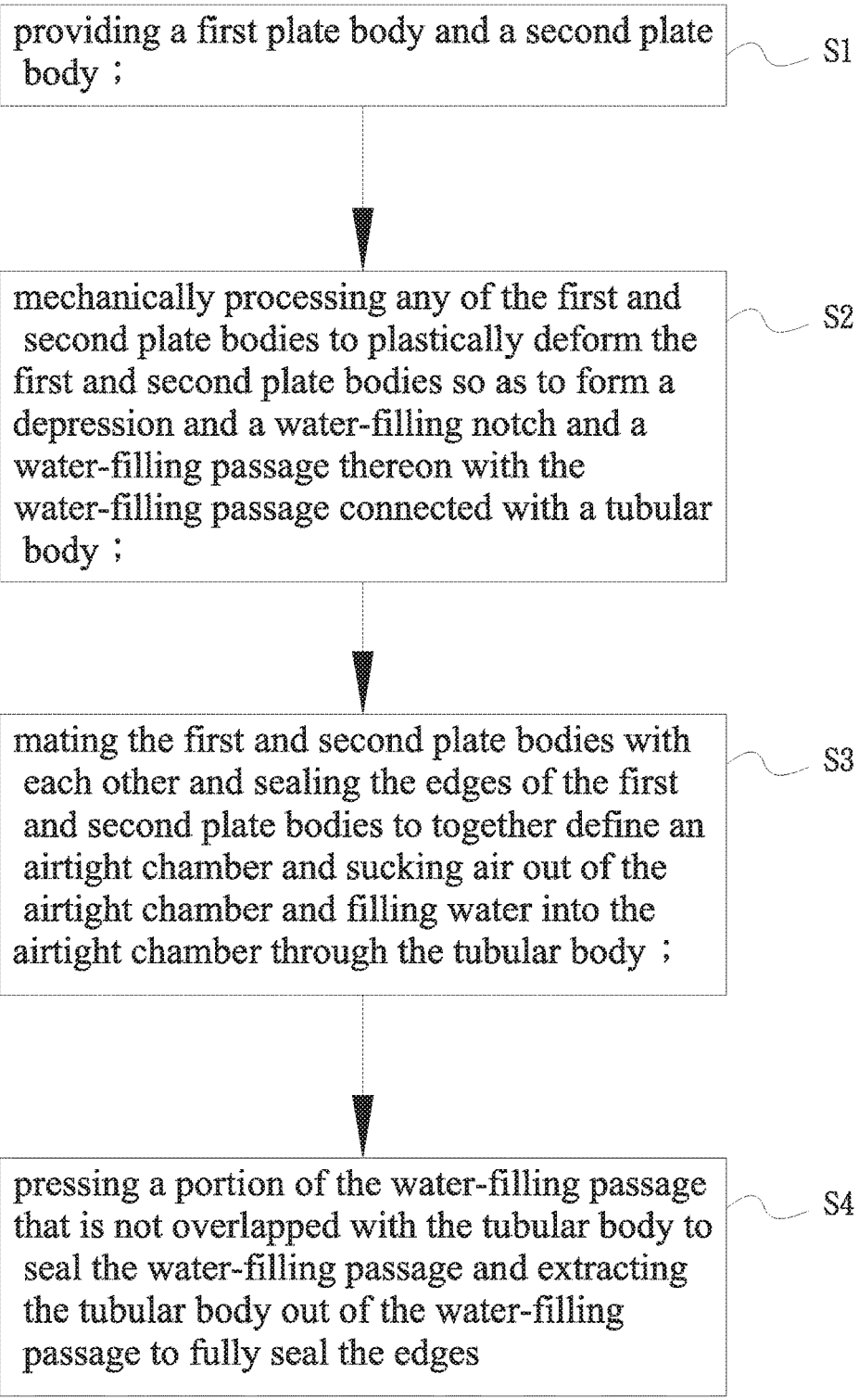
FIG. 10 is a flow chart of a first embodiment of the manufacturing method of the vapor chamber water-filling section sealing structure of the present invention.
Figure 11:
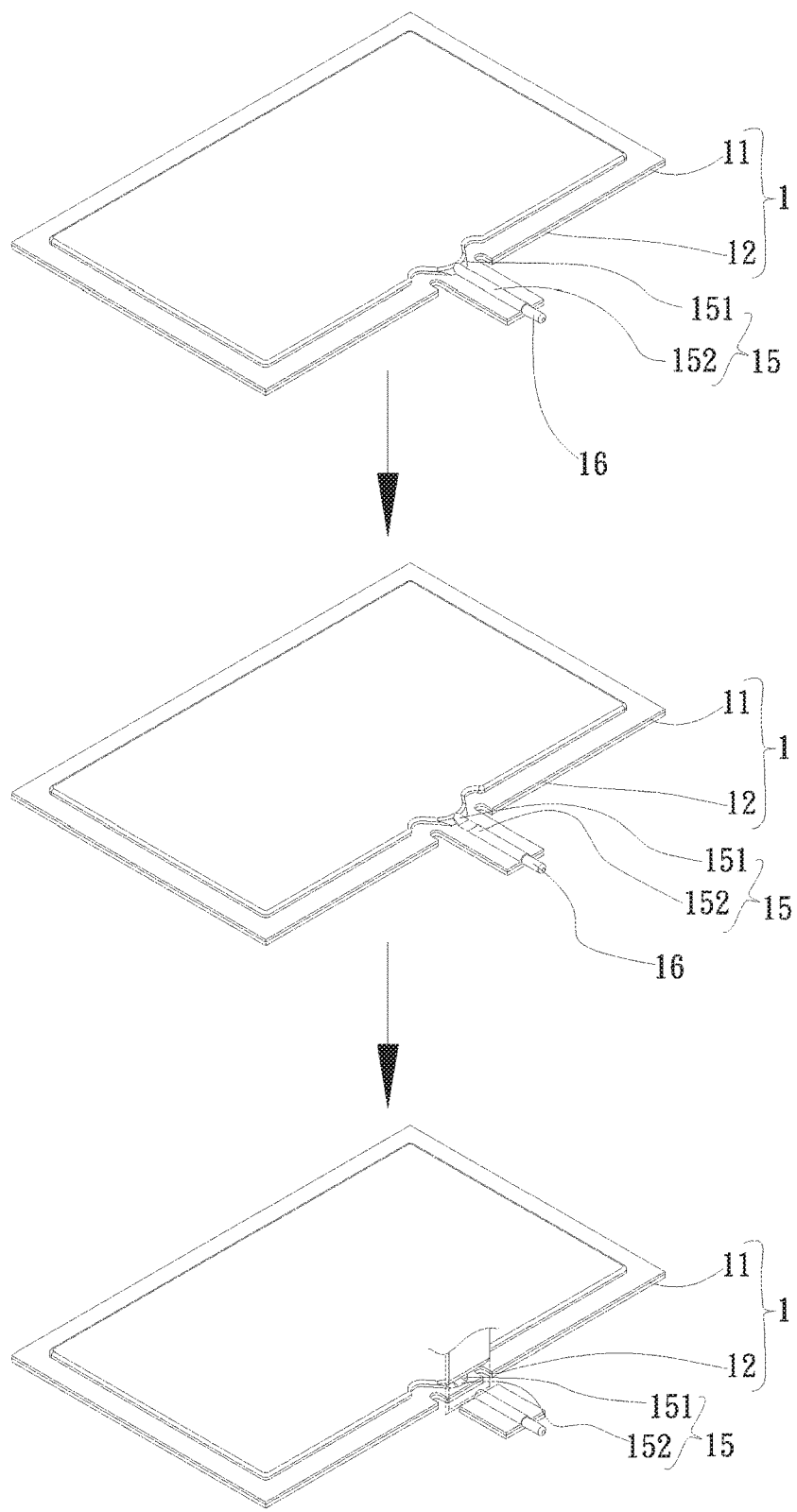
FIG. 11 is a perspective view showing the manufacturing method of the vapor chamber water-filling section sealing structure of the present invention.
Figure 12:
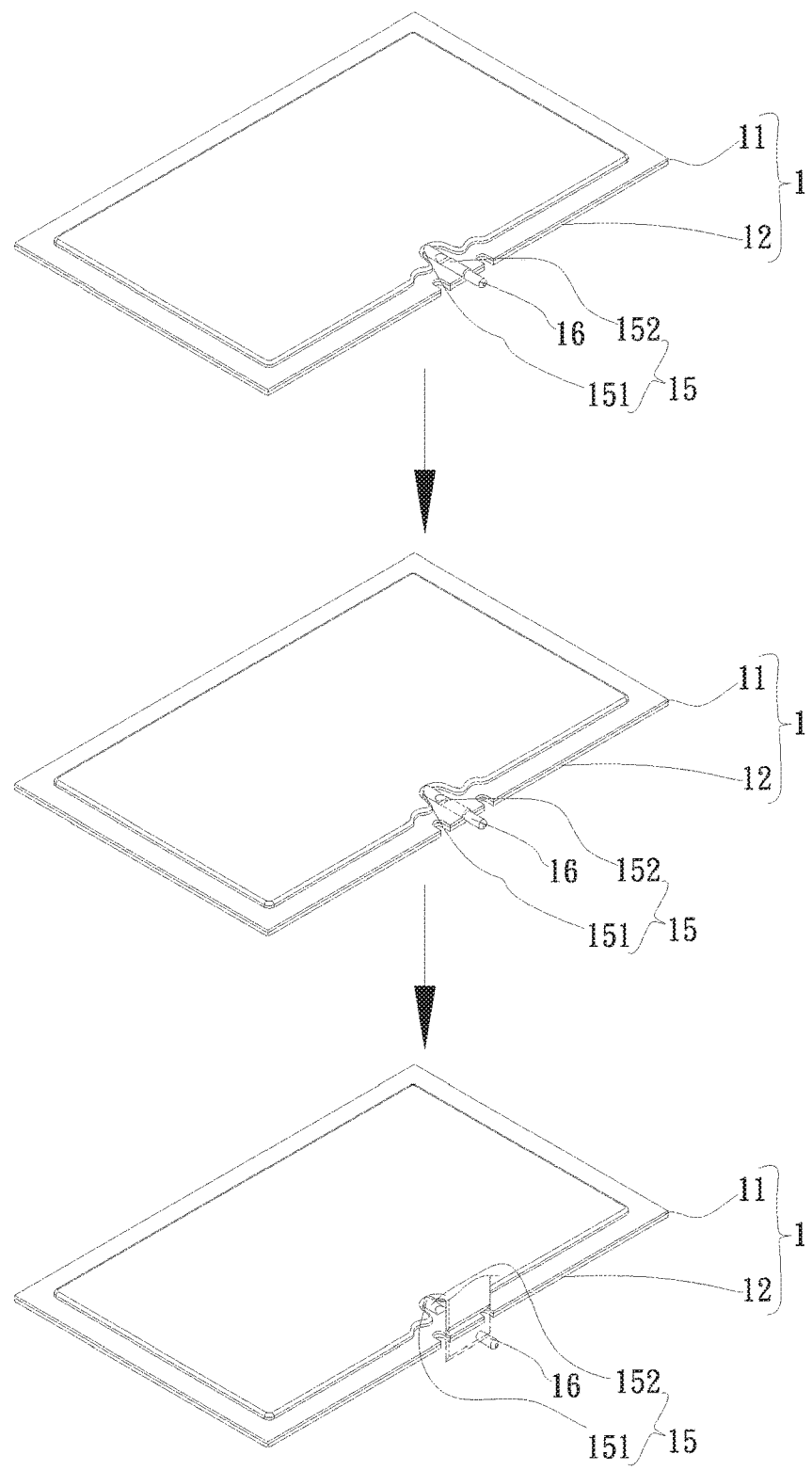
FIG. 12 is another perspective view showing the manufacturing method of the vapor chamber water-filling section sealing structure of the present invention.

Please refer to FIGS. 10, 11 and 12. FIG. 10 is a flow chart of a first embodiment of the manufacturing method of the vapor chamber water-filling section sealing structure of the present invention. FIG. 11 is a perspective view showing the manufacturing method of the vapor chamber water-filling section sealing structure of the present invention. FIG. 12 is another perspective view showing the manufacturing method of the vapor chamber water-filling section sealing structure of the present invention. Also referring to FIGS. 3-9, according to the first embodiment, the manufacturing method of the vapor chamber water-filling section sealing structure of the present invention includes steps of:

S1. providing a first plate body and a second plate body, a first plate body 11 and a second plate body 12 being provided, the first and second plate bodies 11, 12 being made of a material selected from a group consisting of copper, aluminum, commercial pure titanium, copper alloy, aluminum alloy, titanium alloy, ceramic and stainless steel;

S2. mechanically processing any of the first and second plate bodies to plastically deform the first and second plate bodies so as to form a depression and a water-filling notch and a water-filling passage thereon with the water-filling passage connected with a tubular body, any of the first and second plate bodies 11, 12 being mechanically processed and plastically deformed, in this embodiment, the first plate body 11 being, but not limited to, mechanically processed, alternatively, both the first and second plate bodies 11, 12 being mechanically processed, the mechanical processing being punching or forging, the first plate body 11 being formed with a depression 13 protruding from the first plate 111 to the second face 112 of the first plate body 11 and a water-filling section 15 composed of a water-filling notch 151 and a water-filling passage 152, one end of the water-filling passage 152 distal from the water-filling notch 151 being connected with a tubular body 16;

S3. mating the first and second plate bodies with each other and sealing the edges of the first and second plate bodies to together define an airtight chamber and sucking air out of the airtight chamber and filling water into the airtight chamber through the tubular body, the first and second plate bodies 11, 12 being mated with each other and the edges of the first and second plate bodies 11, 12 being sealed, the second plate body 12 being mated with the depressed face (the depression 113 and the water-filling section 15) of the first plate body 11 to form a complete airtight chamber 13, the edges of the first and second plate bodies 11, 12 being sealed by means of diffusion bonding, spot welding or laser welding to form the flange 14, air being sucked out of the airtight chamber and water being filled into the airtight chamber through the tubular body 16; and S4. pressing a portion of the water-filling passage that is not overlapped with the tubular body to seal the water-filling passage and extracting the tubular body out of the water-filling passage to fully seal the edges, a pressure being applied between the water-filling passage 152 and the tubular body 16 to make the water-filling passage 152 deformed from an original raised state into a flattened or a recessed state so as to isolate the water-filling passage 152 from the tubular body 16 and make the airtight chamber 13 fully airtight, the flattened or recessed section being further sealed by means of diffusion bonding, spot welding or laser welding, finally, the tubular body 16 for filling water into the airtight chamber 13 being extracted out of the water-filling passage 152 and the water-filling passage 152 being further pressed to completely seal the edges.

Figure 13:
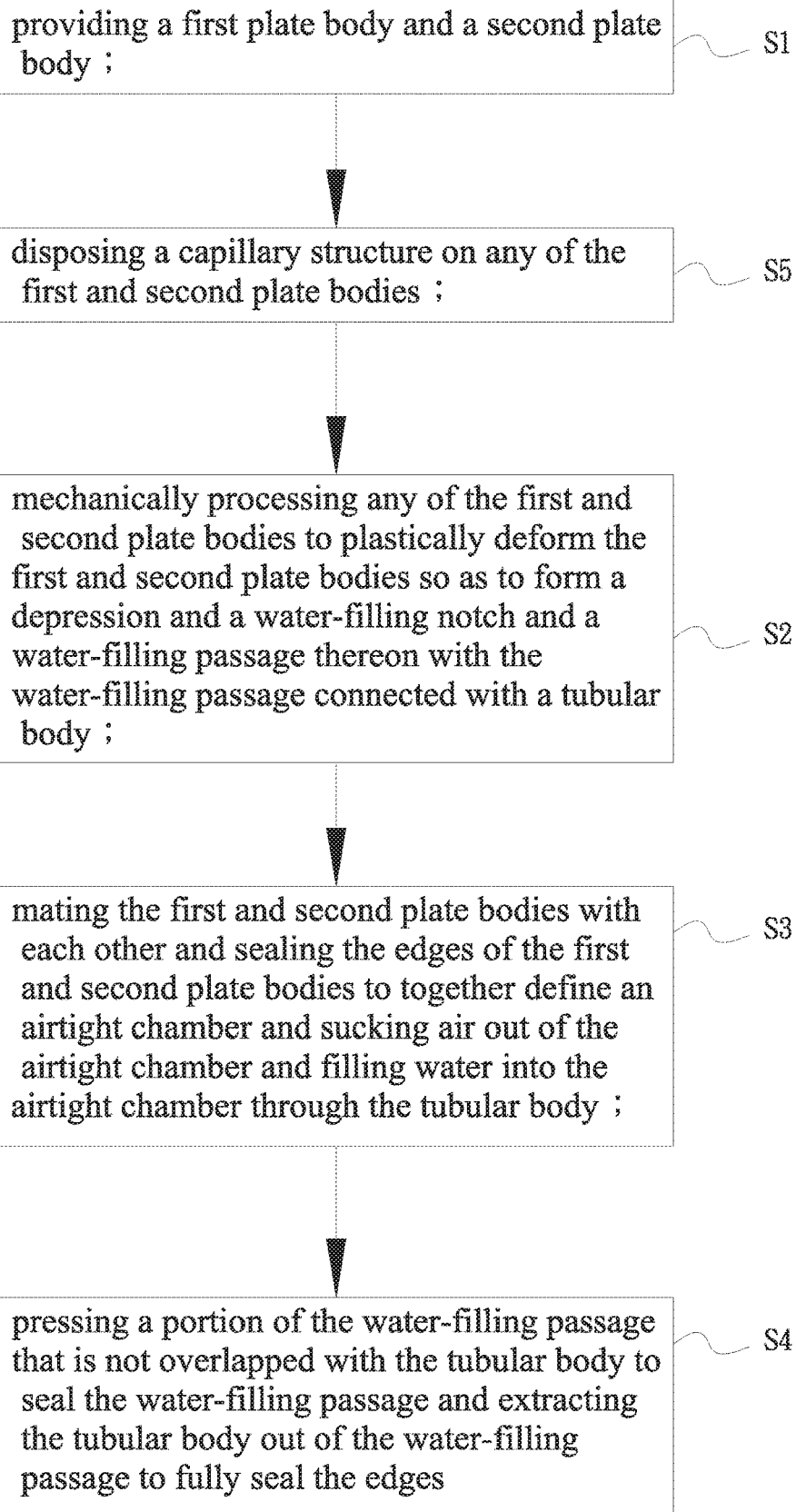
FIG. 13 is a flow chart of a second embodiment of the manufacturing method of the vapor chamber water-filling section sealing structure of the present invention.

Please now refer to FIG. 13, which is a flow chart of a second embodiment of the manufacturing method of the vapor chamber water-filling section sealing structure of the present invention. The second embodiment is different from the first embodiment in that the second embodiment further includes a step S5 of disposing a capillary structure on any of the first and second plate bodies after the step S1 of providing a first plate body and a second plate body. The capillary structure is selected from a group consisting of sintered powder, channeled body, mesh body, fiber body and whiskers.

The capillary structure 2 can be selectively disposed on the first face 111 of the first plat body 11 or the second face 112 of the second plate body 12. Alternatively, the capillary structure 2 can be overlapped with the first and second plate bodies 11, 12. The capillary structure is selected from a group consisting of sintered powder, channeled body, mesh body, fiber body and whiskers.

Still alternatively, the capillary structure 2 can be an independently formed component directly sandwiched between the first and second plate bodies 11, 12.

Please now refer to FIG. 14, which is a flow chart of a third embodiment of the manufacturing method of the vapor chamber water-filling section sealing structure of the present invention. The third embodiment is different from the first embodiment in that the third embodiment further includes a step S6 of cutting off the part of the water-filling section that protrudes from the edges of the first and second plate bodies after the step S4 of pressing a portion of the water-filling passage that is not overlapped with the tubular body to seal the water-filling passage and extracting the tubular body out of the water-filling passage to fully seal the edges.

In the case that a part of the water-filling section 15 protrudes from the edges of the first and second plate bodies 11, 12, the part is cut off by means of punching, mechanical milling or laser cutting.

Figure 15:
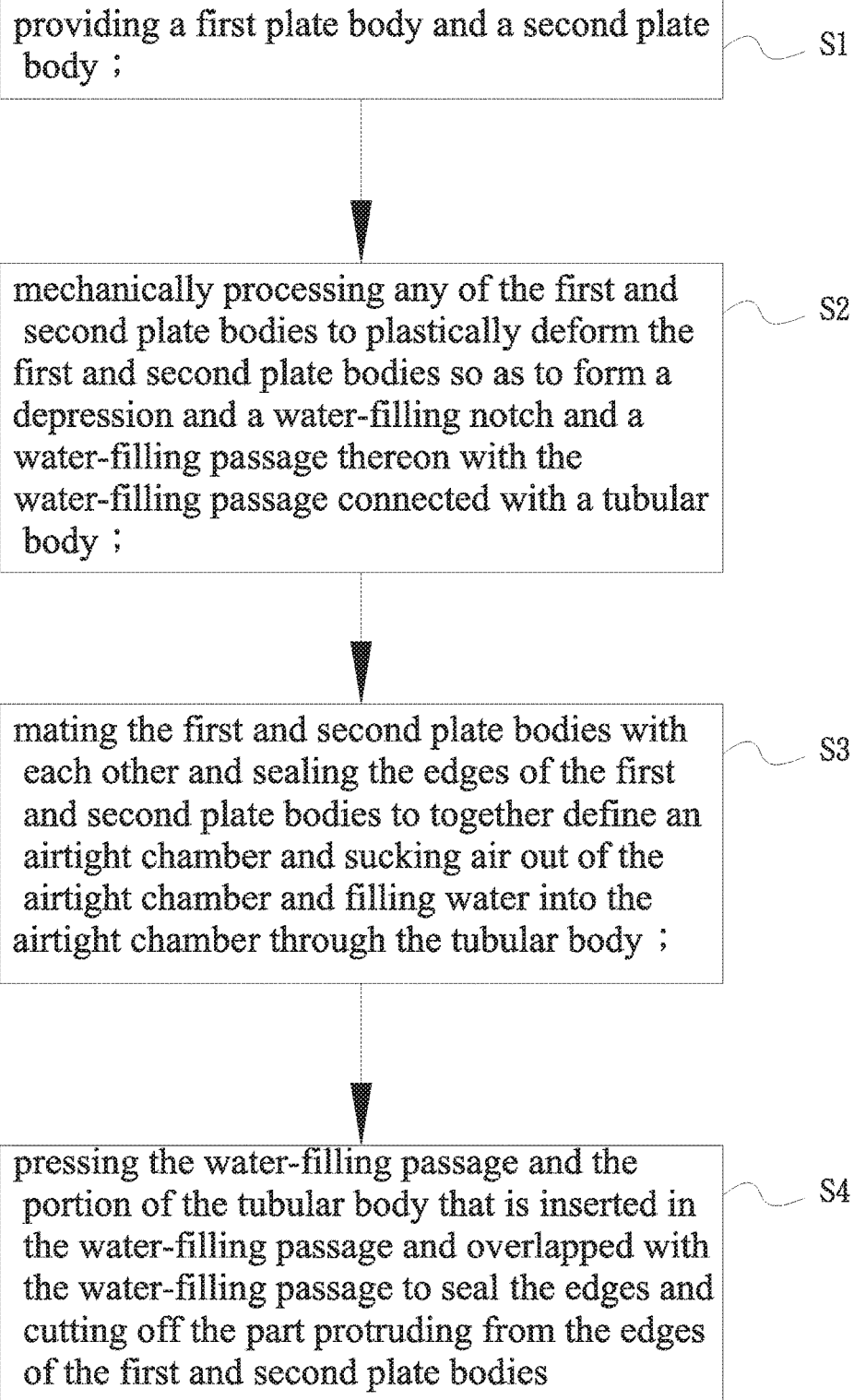
FIG. 15 is a flow chart of a fourth embodiment of the manufacturing method of the vapor chamber water-filling section sealing structure of the present invention.

Please now refer to FIG. 15, which is a flow chart of a fourth embodiment of the manufacturing method of the vapor chamber water-filling section sealing structure of the present invention. The fourth embodiment is different from the first embodiment in that the fourth embodiment includes a step S4 of pressing the water-filling passage and the portion of the tubular body that is inserted in the water-filling passage and overlapped with the water-filling passage to seal the edges and cutting off the part protruding from the edges of the first and second plate bodies.

In this embodiment, the tubular body 16 is not removed. Instead, the water-filling passage 152 and the portion of the tubular body 16 that is inserted in the water-filling passage 152 and overlapped with the water-filling passage 152 are directly pressed and flattened to fully seal the airtight chamber 13 and isolate the airtight chamber 13 from the external side. In addition, the part protruding from the edges of the first and second plate bodies 11, 12 is cut off.

The manufacturing method of the vapor chamber water-filling section sealing structure of the present invention can eliminate the shortcoming of the conventional vapor chamber that the water-filling section protrudes from the edge of the main body and is apt to be collided and damaged to fail. In addition, the space of the internal airtight chamber can be increased to enhance the heat conduction efficiency. Moreover, the prevent invention provides a wider airtight edge-sealing range for the first and second plate bodies.

In the water-filling operation of the above embodiments of the present invention, the working fluid is mainly a common working fluid applied to the general vapor chamber manufacturing process or structure. The working fluid is not denoted with any reference numeral in the drawings of the respective embodiments.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A manufacturing method of a vapor chamber water-filling section sealing structure comprising steps of:
   providing a first plate body and a second plate body;
   mechanically processing any of the first and second plate bodies to plastically deform at least one of the first and second plate bodies so as to form a depression, a water-filling notch, and a water-filling passage, the water-filling passage extending outwardly beyond edges of the first and second plate bodies and horizontally positioned with the first and second plate bodies and with the depression;
   connecting a tubular body with the water-filling passage;
   mating the first and second plate bodies with each other, sealing the edges of the first and second plate bodies together such that each of the first and second plate bodies define portions of an airtight chamber, of the water-filling notch, and of the water-filling passage, sucking air out of the airtight chamber, and filling water into the airtight chamber through the tubular body; and
   pressing and cutting a portion of the water-filling passage that is not overlapped with the tubular body and protrudes from the edges of the first and second plate bodies to fully seal the water-filling passage and the cut edges of the first and second plate bodies.

2. The manufacturing method of the vapor chamber water-filling section sealing structure as claimed in claim 1, wherein the mechanical processing is punching.

3. The manufacturing method of the vapor chamber water-filling section sealing structure as claimed in claim 1, wherein the first and second plate bodies are correspondingly mated with each other and the edges of the first and second plate bodies are sealed by means of welding or diffusion bonding.

4. The manufacturing method of the vapor chamber water-filling section sealing structure as claimed in claim 1, further comprising a step of disposing a capillary structure on any of the first and second plate bodies after the step of providing a first plate body and a second plate body, the capillary structure being selected from a group consisting of sintered powder, channeled body, mesh body, fiber body and whiskers.

5. The manufacturing method of the vapor chamber water-filling section sealing structure as claimed in claim 1, the portion of the water-filling passage being cut off by means of punching, mechanical milling, or laser cutting.

6. A method of manufacturing a vapor chamber water-filling section sealing structure comprising steps of:
providing a first plate body and a second plate body;
mechanically processing any of the first and second plate bodies to plastically deform at least one of the first and second plate bodies so as to form a depression, a water-filling notch, and a water-filling passage, the water-filling passage extending outwardly beyond edges of the first and second plate bodies and horizontally positioned with the first and second plate bodies and with the depression;
connecting a tubular body with the water-filling passage;
mating the first and second plate bodies with each other, sealing the edges of the first and second plate bodies together such that each of the first and second plate bodies define portions of an airtight chamber, of the water-filling notch, and of the water-filling passage, sucking air out of the airtight chamber, and filling water into the airtight chamber through the tubular body; and
pressing the water-filling passage and a portion of the tubular body that is inserted in the water-filling passage and overlapped with the water-filling passage to seal the edges and cutting off a part of the water-filling passage and tubular body protruding from the edges of the first and second plate bodies.

\* \* \* \* \*